United States Patent

Beer et al.

Patent Number: 5,392,986
Date of Patent: Feb. 28, 1995

[54] CUP-LIKE PACKAGE WITH COVER FILM OF PLASTIC

[75] Inventors: Ekkehard Beer, Bad Schwalbach; Alfred Schad, Wiesbaden, both of Germany

[73] Assignee: Hoechst Aktiengesellschaft, Frankfurt am Main, Germany

[21] Appl. No.: 215,655

[22] Filed: Mar. 22, 1994

Related U.S. Application Data

[63] Continuation of Ser. No. 885,674, May 19, 1992, abandoned.

[30] Foreign Application Priority Data

May 23, 1991 [DE] Germany .............................. 4116808

[51] Int. Cl.$^6$ .......................... B65D 1/34; B65D 43/02
[52] U.S. Cl. ............................ 229/125.35; 229/123.1; 229/123.2; 229/3.5 R; 428/35.7
[58] Field of Search ............. 229/3.5 R, 123.1, 123.2, 229/123.3, 125.35; 428/35.7, 35.8, 35.9, 156; 426/127

[56] References Cited

U.S. PATENT DOCUMENTS

| | | | |
|---|---|---|---|
| 3,335,939 | 8/1967 | Robinson, Jr. | 229/123.2 |
| 3,547,338 | 12/1970 | Hemmes | 229/125.35 |
| 3,865,302 | 2/1975 | Kane | 229/123.1 |
| 3,997,677 | 12/1976 | Hirsch et al. | 229/125.35 |
| 4,183,435 | 1/1980 | Thompson et al. | 426/127 |
| 4,456,639 | 6/1984 | Drower et al. | 229/3.5 R |
| 4,469,258 | 9/1984 | Wright et al. | 229/123.1 |
| 4,518,643 | 5/1985 | Francis | 428/156 |
| 4,692,327 | 9/1987 | Takahashi et al. | 428/35.7 |
| 4,734,335 | 3/1988 | Monzer | 428/480 |
| 4,933,216 | 6/1990 | Filbert et al. | 428/156 |

FOREIGN PATENT DOCUMENTS

| | | |
|---|---|---|
| 0007971 | 2/1980 | European Pat. Off. . |
| 0149180 | 7/1985 | European Pat. Off. . |
| 2717866 | 10/1978 | Germany . |
| 1301336 | 12/1989 | Japan ................... 428/35.7 |
| 3032837 | 2/1991 | Japan ................... 428/35.7 |
| 673827 | 4/1990 | Switzerland . |

*Primary Examiner*—Gary E. Elkins
*Attorney, Agent, or Firm*—Foley & Lardner

[57] ABSTRACT

A cup-like package of plastic for substantially flowable or pourable products is described. It includes a one-piece receptacle, the top filling and removal opening of which is sealed by a peel-off cover film. The cover film, which is of plastic, has a surface texturing.

12 Claims, 1 Drawing Sheet

U.S. Patent
Feb. 28, 1995
5,392,986
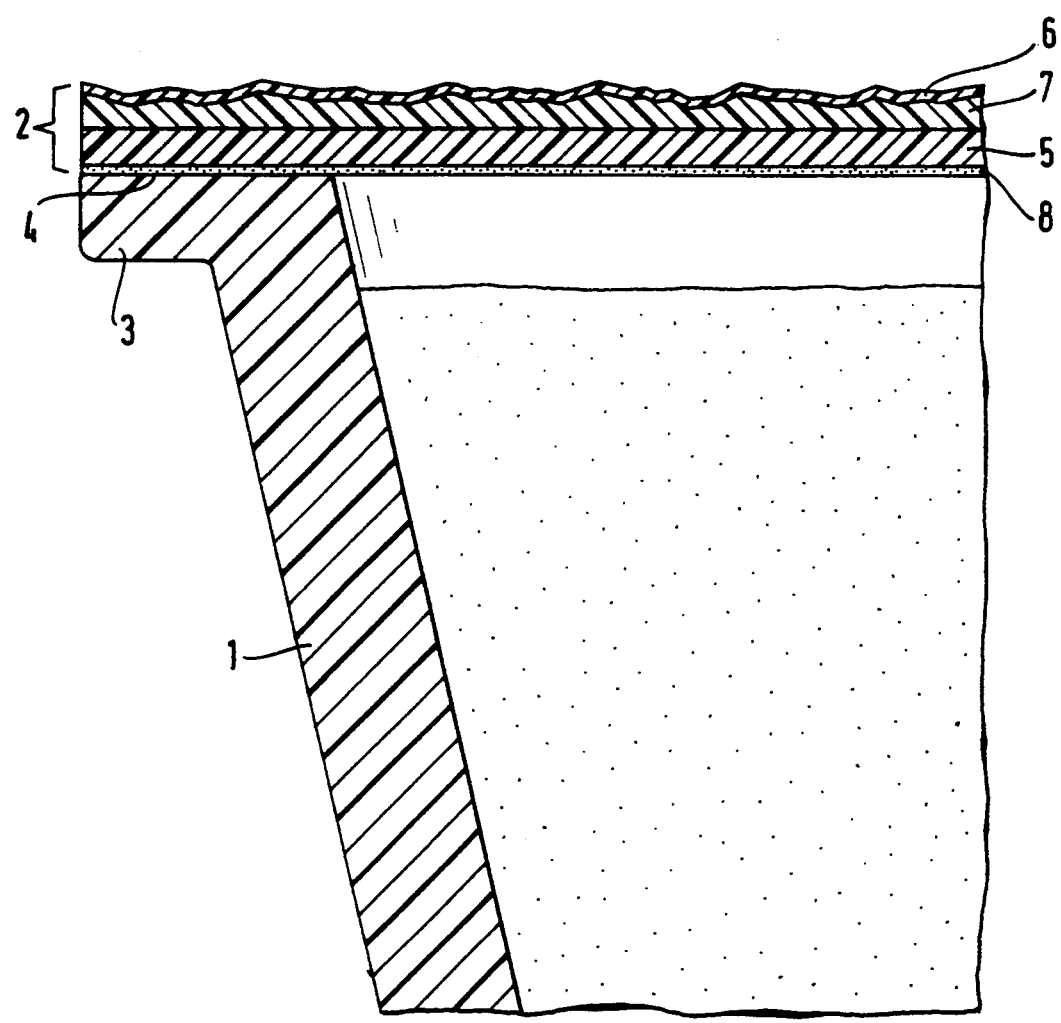

CUP-LIKE PACKAGE WITH COVER FILM OF PLASTIC

This application is a continuation of application Ser. No. 07/885,674, filed May 19, 1992, now abandoned.

BACKGROUND OF THE INVENTION

1. Field of the Invention

The present invention relates to a cup-like package of plastic for substantially flowable or pourable products, having a one-piece receptacle, the top filling and removal opening of which is sealed by a peel-off cover film.

2. Discussion of the Related Art

Cup packs of plastic for foodstuffs such as dairy products, pudding, baby food and the like are produced on a large scale and successfully sold. The reason for this is that plastics generally have an exceptionally good mechanical resistance, which facilitates the transportation and storage of the packaged products concerned. In addition, most plastics have an outstanding barrier effect against water and water vapor, as a result of which any drying-out of the packaged contents or their contamination from outside is effectively prevented. To be regarded as a further reason is that plastic can be readily given a visually appealing appearance by molding and coloring, the intention being that in this way the producers can, as they wish, appeal in a particularly attractive way to the aesthetic sensitivity of consumers and give the impression of high quality.

Usually, the cup packs, which are sealed with printed cover films, can be readily opened by using two fingers on a flange which either protrudes to the side or is hinged to the edge of the cup to peel off the cover film to the rear, thereby exposing the removal opening of the cup.

The production process of the filled cup packs provides that, first of all, the receptacle is filled with the product, after which the sheet for the cover film is laid in place and joined to the receptacle by a continuous sealing seam. All the process steps are usually carried out automatically on packaging machines. Therefore, it has been found to be particularly expedient to produce the cover as a metal foil or at least from a laminate containing metal foil, because this material can be embossed with a suitable surface finish in such a way that no operational disruptions are caused on the automatic packaging machines due to cover sheets sticking together. However, metal foils have disadvantages in that they are a very energy-intensive packaging material, have a low puncture resistance during transportation (shopping carts) and because, owing to the disposal necessary on account of the intended purpose of the packages, it is endeavored to provide homogeneous packages, that is, packages of homogeneous material.

SUMMARY OF THE INVENTION

The object of the present invention is thus to provide a cup-like package which has a cover film of plastic rather than a metal foil, it nevertheless being possible without any problems to process the cover film in the form of prefabricated sheets on high-speed automatic packaging machines.

This object is achieved according to the invention by a cup-like package having a cover film of plastic with a surface texturing.

The cup-like package of the invention includes a one-piece receptacle with a top filling and removal opening, and a plastic cover film with a surface texturing sealing the opening.

BRIEF DESCRIPTION OF THE DRAWING

The invention is explained in more detail by way of example below with reference to the single FIGURE of drawing, without being restricted to the specific form of representation.

The FIGURE shows a vertical section through part of a package according to the invention in side view.

DETAILED DESCRIPTION OF THE PREFERRED EMBODIMENTS

The deep-drawn cup part 1 and the cover film 2 are particularly emphasized by reference numerals. The cover film 2 is joined to the edge flange 3 by means of the sealing seam 4. The cover film 2 comprises two polyester layers 5 and 6, between which an embossable copolyester layer 7 is embedded. In addition, the cover film 2 of the representation also has a sealing layer 8.

According to the invention, the surface texturing is to be an embossed pattern, that is, the result of an embossing step, in which generally speaking a film surface is marked or textured by sinking-in heated engraved molding stamps or rolls, such as so-called embossing dies. The embossing depth, measured as the difference in height from the peak of an elevation to the bottom of a valley, is to be, according to the invention, in the range from 0.5 to 50 $\mu$m, preferably from 3 to 30 $\mu$m, particularly preferably from 5 to 20 $\mu$m.

According to the invention, a film of polyester, preferably a multi-layered film of polyester, is particularly well suited as cover film. A suitable film is described, for example, in EP-A-115 033 and is made up of two outer polyester layers, between which a third, lower-melting polyester layer is embedded. So far, in practice, polyethylene terephthalate has proved best as polyester material for the outer layers, whereas a copolyester which contains in addition to ethylene-terephthalate units also ethylene-isophthalate units in a quantity of between 5 and 50 mol %, based on the total content of the copolyester, is used for the inner intermediate layer.

The cover film for the cup package bears on its underside, that is, by definition, the side which does not come into contact with the embossing die and which on the finished cup pack is facing the filling and removal opening of the receptacle, an additional sealing layer. Hot-sealing or cold-sealing layers based on polyolefin, polyvinylidene chloride, copolyesters or polyacrylate/-methacrylate mixtures are particularly suitable as sealing layers, which can be applied either from dispersion, by extrusion or by coextrusion.

On the upper side, that is by definition the side of the cover film which is facing the embossing die, the cover film may be provided with a metallization and/or a print.

The overall thickness of the cover film preferably lies in the range from 20 to 1,000 $\mu$m, in particular from 30 to 500 $\mu$m, particularly preferably from 35 to 200 $\mu$m.

The receptacle of the cup pack according to the invention, from now on also referred to as the cup part, is preferably molded in one piece and preferably by the deep-drawing process from thermoplastic material. The cup part has an edge flange, which surrounds the top filling and removal opening, preferably extends in a plane and forms a continuous line. The cover film is joined to the edge flange by the sealing seam.

The cover film of plastic used in the case of the package according to the invention additionally offers the advantage over a cover foil of metal that, by virtue of the material, the tear strength is greater and that therefore virtually no tearing is observed when removing the cover film, instead the entire cover film can be removed effortlessly from the filling and removal opening.

Other objects, features and advantages of the present invention will become apparent to those skilled in the art from the foregoing detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A cup-like package for substantially flowable products, comprising:
   (a) a one-piece receptacle with a top filling and removal opening; and
   (b) a peel-off multi-layered polyester plastic cover film sealing the opening, having a surface texture, said multi-layered polyester plastic cover film comprising two outer polyester layers, and a third, lower-melting polyester layer embedded therebetween.

2. The package as claimed in claim 1, wherein the surface texturing is an embossed pattern.

3. The package as claimed in claim 2, wherein the embossed pattern has an embossing depth, measured as the difference in height from a peak of an elevation to a bottom of a valley, in the range from 0.5 to 50 $\mu$m.

4. The package as claimed in claim 3, wherein the embossing depth is in the range from 3 to 30 $\mu$m.

5. The package as claimed in claim 4, wherein the embossing depth is in the range from 5 to 20 $\mu$m.

6. The package as claimed in claim 1, wherein the polyester film for the outer layers includes polyethyleneterephthalate and wherein the third layer includes a copolyester including ethyleneterephthalate units and ethyleneisophthalate units in a quantity of between 5 and 50 mol %, based on the total content of the copolyester.

7. The package as claimed in claim 1, wherein the cover film includes on an underside an additional sealing layer.

8. The package as claimed in claim 7, wherein the sealing layer is comprised of a polyolefin, polyvinylidene chloride, a copolyester or a polyacrylate/methacrylate mixture.

9. The package as claimed in claim 1, wherein the cover film is provided on an upper side with at least one of a metallization and a print.

10. The package as claimed in claim 1, wherein the cover film has an overall thickness in the range from 20 to 1,000 $\mu$m.

11. The package as claimed in claim 10, wherein the overall thickness of the cover film is in the range from 30 to 500 $\mu$m.

12. The package as claimed in claim 11, wherein the overall thickness of the cover film is in the range from 35 to 200 $\mu$m.

* * * * *